F. E. WYNNE.
COIL RETAINING DEVICE.
APPLICATION FILED JULY 3, 1916.
1,271,409.
Patented July 2, 1918.
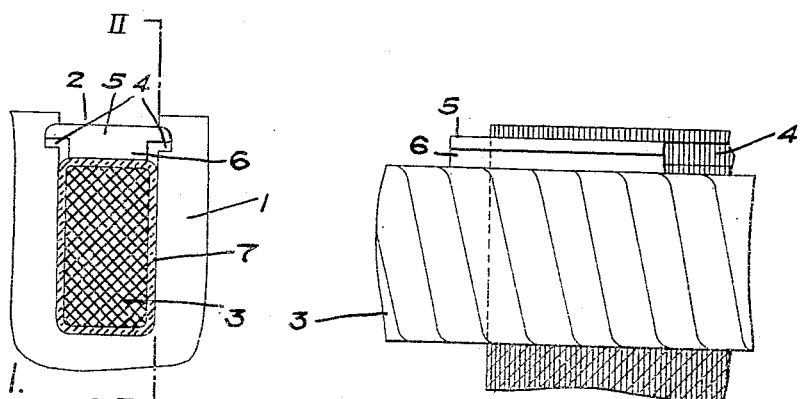
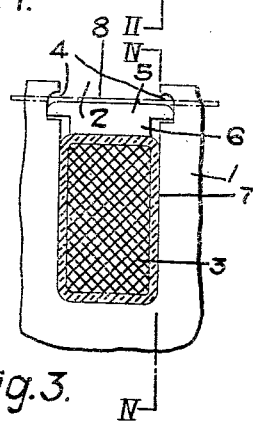
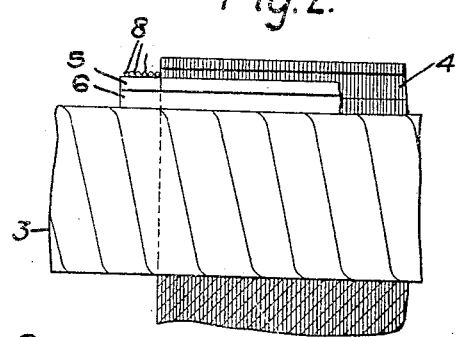
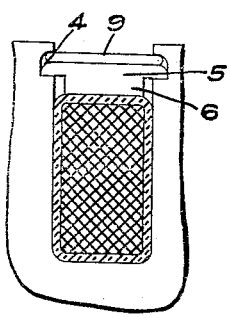
Fig. 5.
WITNESSES:
INVENTOR
Francis E. Wynne.
BY
ATTORNEY

UNITED STATES PATENT OFFICE.

FRANCIS E. WYNNE, OF WILKINSBURG, PENNSYLVANIA, ASSIGNOR TO WESTINGHOUSE ELECTRIC AND MANUFACTURING COMPANY, A CORPORATION OF PENNSYLVANIA.

COIL-RETAINING DEVICE.

1,271,409.   Specification of Letters Patent.   Patented July 2, 1918.

Application filed July 3, 1916. Serial No. 107,265.

*To all whom it may concern:*

Be it known that I, FRANCIS E. WYNNE, a citizen of the United States, and a resident of Wilkinsburg, in the county of Allegheny and State of Pennsylvania, have invented a new and useful Improvement in Coil-Retaining Devices, of which the following is a specification.

My invention relates to coil-retaining devices for dynamo-electric machines and it has for its object to provide a device that may be readily applied to the magnetizable core member of a dynamo-electric machine in order to securely retain the coils in the slots of such member.

A further object of my invention is to provide a coil-retaining device of the character above-described that shall be capable of adjustment with respect to the coil after it has been driven into the slot.

It has been found that the coils of dynamo-electric machines often undergo a certain shrinkage and reduction in size owing to the drying-out of the insulating material surrounding the coil and the individual conductors thereof after the coil has been placed in the slot. When coil-retaining devices of the wedge type are employed to retain the coils in the slots, the shrinkage of insulating material causes the coils to work loose from the said devices and chafe against the walls of the slot, with consequent damage to the insulation of the coil.

According to my invention, I provide a coil-retaining device that may be readily adjusted to compensate for the above-mentioned shrinkage of the coils without being removed from the slot.

In the accompanying drawing, Figure 1 is a transverse sectional view through a portion of the core member of a dynamo-electric machine, showing my coil-retaining device as originally applied thereto; Fig. 2 is a longitudinal sectional view along the line II—II of Fig. 1; Fig. 3 is a sectional view, similar to Fig. 1, showing a coil-retaining device after it has been adjusted; Fig. 4 is a longitudinal sectional view along the line IV—IV of Fig. 3, and Fig. 5 is a sectional view, similar to Fig. 1, showing a modification of my invention.

A magnetizable core member 1 is provided with a plurality of peripheral slots 2 in which coils 3 are located. The walls of each slot 2 are provided with oppositely disposed, longitudinally-extending grooves 4. The coils 3 are secured in the slots by means of coil-retaining devices or wedges 5 that are preferably composed of some hard and durable insulating material. Each wedge 5 is formed from a strip of insulating material of substantially the same width as the distance between the sides of the grooves 4. The edges of one side of the wedge 5 are cut away, by machining or otherwise, to substantially one-half the thickness of the wedge to form a reduced portion 6 of less width than the distance between the walls of the slot 2.

After the coil 3 has been placed in the slot 2, the wedge 5 is driven into the groove 4, the wedge being so proportioned that the sides thereof are in close engagement with the sides of the groove 4, and the face of the reduced portion 6 is in close engagement with the insulating material 7 surrounding the coil 3, as best shown in Figs. 1 and 2. The wedge 5 is of such length as to extend beyond the face of the core member 1. After the insulation 7 of the coil 3 has dried out and has shrunk to the proportions shown in Fig. 3, in a somewhat exaggerated manner, suitable banding 8 is applied to the portion of the wedge projecting beyond the face of the core member 1 or the banding may be applied at points intermediate the ends of the core member. The banding 8 forces the wedge 5 downwardly into the slot until the reduced portion 6 again comes into contact with the coil, as best shown in Figs. 3 and 4. The shrinkage of the coil 3 may be compensated for in another manner, as shown in Fig. 5, wherein a thin strip 9 is driven into the slot between the top of the grooves 4 and the wedge 5 in order to force the wedge 5 downwardly into the slot.

It is apparent from the foregoing that shrinkage of the coils may be compensated for several times, as only a very slight decrease in the dimensions of the coils will cause them to become loose, whereas the range of adjustment of the wedges is relatively large. A further advantage obtained by my invention is that, when the wedges are first driven into the slots, the cut-away portions prevent the lower edges of the wedge from binding with the sharp corners of the groove.

While I have shown my invention in its simplest and preferred forms, it is not so limited but is susceptible of various changes and modifications within the scope of the appended claims.

I claim as my invention:

1. In a dynamo-electric machine, the combination with a magnetizable core member having a plurality of coil-containing slots having longitudinal grooves in the sides thereof, of devices for holding the coils in position each of which comprises a portion located in said grooves and a portion projecting into said slot below said grooves to engage said coil and means for moving said devices radially inwardly.

2. In a dynamo-electric machine, the combination with a magnetizable core member having a plurality of coil-containing slots having longitudinal grooves in the sides thereof, of devices for holding the coils in position each of which comprises a portion located in said grooves and radially movable therein and a portion projecting into said slot below said grooves to engage said coil, said devices having end members protruding from said magnetizable core member and means attached to said end members to hold said devices in engagement with said coils.

3. In a dynamo-electric machine, the combination with a magnetizable core member having a plurality of coil-containing slots having longitudinal grooves in the sides thereof, of devices for holding the coils in position each of which comprises a portion located in said grooves and radially movable therein and a portion projecting into said slot below said grooves to engage said coil, said devices having end members protruding from said magnetizable core member and banding material wound on said protruding end members to hold said devices in engagement with said coils.

4. In a dynamo-electric machine, the combination with a magnetizable core member having a plurality of coil-containing slots having longitudinal grooves in the sides thereof, of devices for holding the coils in position, each of which comprises a portion located in said grooves and radially movable therein and a portion projecting into said slot below said grooves to engage said coil, said devices having end members protruding from said magnetizable core member and wire wound on said protruding end members to hold said devices in engagement with said coils.

5. In a dynamo-electric machine, the combination with a magnetizable core member provided with a plurality of coil-containing slots having longitudinal grooves in the sides thereof, of devices for holding the coils in position each of which comprises a main body portion located in said slots and engaging said coil and having portions projecting into said grooves and means for moving said devices radially inwardly.

6. In a dynamo-electric machine, the combination with a magnetizable core member provided with a plurality of coil-containing slots having longitudinal grooves in the sides thereof, of devices for holding the coils in position comprising members located in said slots adjacent said coils and adapted to be moved radially within said slots.

In testimony whereof, I have hereunto subscribed my name this 29th day of June, 1916.

FRANCIS E. WYNNE.

Copies of this patent may be obtained for five cents each, by addressing the "Commissioner of Patents, Washington, D. C."